United States Patent Office 3,522,247
Patented July 28, 1970

3,522,247
2-AMINO-6,7-DISUBSTITUTED-4H-1,3-BENZOTHI-AZINE-4-ONES AS BRONCHODILATORS
Timothy H. Cronin, Niantic, and Hans-Jurgen E. Hess, Groton, Conn., assignors to Chas. Pfizer & Co., Inc., New York, N.Y., a corporation of Delaware
No Drawing. Filed Nov. 7, 1967, Ser. No. 681,088
Int. Cl. C07d 93/12; A61k 27/00
U.S. Cl. 260—243          6 Claims

ABSTRACT OF THE DISCLOSURE 2-amino - 6,7 - disubstituted - 4H - 1,3-benzothiazine-4-ones, the 2-substituted amino derivatives thereof and pharmaceutically-acceptable salts thereof possess bronchodilatory activity and inhibit phosphodiesterase enzyme activity. The compounds are prepared by condensation of an o-mercaptobenzoic acid ester with a cyanamide in the presence of triethylamine.

BACKGROUND OF THE INVENTION

This invention relates to novel chemotherapeutic agents; in particular, it relates to certain 4H-1,3-benzothiazine-4-ones which are effective bronchodilating agents.

Treatment of subjects suffering from bronchoconstriction, which may either be functional or caused by allergenic or asthmatic conditions or result from microbial infection, requires that the therapeutic agent effectively cause bronchodilation at dosage levels which do not cause other undesirable effects in the subject. The compounds of this invention manifest broncholiatory activity at dosage levels at which no substantial adverse effects are manifested in the treated individuals, and thus are effective in the symptomatic treatment of asthma and other respiratory disorders such as chronic bronchitis and emphysema. Unsubstituted 2 - amino-4H-1,3-benzothiazine-4-one is reported in the prior art, e.g., J. C. Howard, J. Org. Chem. 29, 761–2 (1964). However, the prior art does not teach that this compound possesses chemotherapeutic properties, and, in fact, this compound does not exhibit useful bronchodilator activity as do the novel compounds of the instant invention.

SUMMARY OF THE INVENTION

The novel compounds of the instant invention are 4H-1,3-benzothiazine-4-ones of the formulae

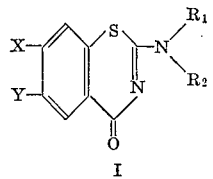

and

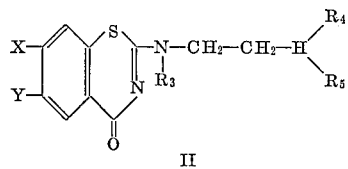

wherein:

X and Y are each selected from the group consisting of hydroxyl, alkoxyl containing up to 4 carbon atoms, and, X and Y taken together, alkylenedioxy containing up to 4 carbon atoms;

$R_1$ and $R_2$ are each selected from the group consisting of hydrogen, alkyl containing up to 6 carbon atoms, alkenyl containing up to 6 carbon atoms, β-hydroxyethyl, aryl containing up to 10 carbon atoms having up to 2 substituents each selected from the group consisting of alkyl containing up to 3 carbon atoms, alkoxyl containing up to 2 carbon atoms, halogen and amino, and $R_1$ and $R_2$, when taken together, form a heterocycle selected from the group consisting of morpholino, thiomorpholino, piperazino N-carbalkoxypiperazino wherein said carbalkoxy moiety contains up to 4 carbon atoms, N-alkylpiperazino wherein said alkyl moiety contains up to 4 carbon atoms, N-alkenylpiperazino wherein said alkenyl moiety contains up to 4 carbon atoms, and N-phenylpiperazino wherein said phenyl moiety has up to 2 substituents each selected from the group consisting of alkyl containing up to 3 carbon atoms, alkoxyl containing up to 2 carbon atoms, halogen and amino; and $R_3$, $R_4$ and $R_5$ are each hydrogen or alkyl containing up to 6 carbon atoms. These compounds, and their pharmaceutically-acceptable salts, are useful as bronchodilator agents. The compounds of Formula I are the preferred therapeutic agents, especially where X and Y are each alkoxyl. The instant compounds inhibit the activity of the enzyme phosphodiesterase.

DETAILED DESCRIPTION OF THE INVENTION

The 2 - amino-6,7-disubstituted-4H-1,3-benzothiazine-4-ones of the instant invention are prepared by condensation of esters of 3,4-disubstituted-6-mercaptobenzoic acids of the formula

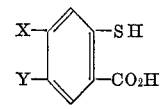

wherein X and Y are as aforesaid, with an appropriate cyanamide. The substituents of the cyanamide will correspond to the substituents of the 2-amino moiety of the desired product, e.g., cyanamide itself will result in the formation of the 4H-1,3-benzothiazine-4-one of Formula I wherein $R_1$ and $R_2$ are each hydrogen, aminoethyl cyanamides will result in the formation of products of Formula II, etc.

In those cases where the desired product bears an unsubstituted amino group in the 2-position, i.e., compounds of Formula I wherein $R_1$ and $R_2$ are each hydrogen, cyanamide and the mercaptobenzoic acid ester will condense as desired merely upon heating them in an inert organic solvent such as dimethylformamide, and the like. Neither reaction time nor temperature is critical. The reaction may be conducted at the reflux temperature of the solvent or at lower temperatures, with longer reaction times desirable at the lower temperatures; heating over a steam bath for approximately on hour has been found to be sufficient in many instances. It is preferable to use approximately equimolar quantities of the two substrates, although an excess of either agent may be used if desirable for any reason. The product may be isolated and purified in a variety of ways using methods well known to those skilled in the art, for example by precipitation and recrystallization from an appropriate solvent. Ethyl acetate, methanol, chloroform, diethyl ether, etc. are useful for this purpose.

In those instances where the desired product has a substituted amino group at the 2-position, it is necessary to add a base to the reaction mixture to catalyse the condensation; substituted cyanamides will not spontaneously condense with the mercaptobenzoic acid ester. Basic materials such as amines and the like are adequate for this purpose, and it is desirable that at least an equivalent amount of the base be present. It may be convenient to use a solvent amount of the base and thereby avoid the need for additional solvents. For example, the reaction can be conducted conveniently in an excess of triethylamine.

The novel compounds of the instant invention are useful bronchodilators and may be conveniently administered in the form of pharmaceutically-acceptable salts. By "pharmaceutically-acceptable" is meant those salts which do not have substantially greater toxicity than the free compound. The pharmaceutically acceptable acid addition salts include salts of mineral acids such as hydrochloric, hydrobromic, hydriodic, phosphoric, metaphosphoric, nitric and sulfuric acids, as well as salts of organic acids such as tartaric, acetic, citric, maleic, benzoic, glycollic, gluconic, gulonic, succinic, arylsulfonic, e.g. p-toluenesulfonic acid and the like.

The pharmaceutically-unacceptable salts, while not useful for therapy, are valuable for use in the isolation and purification of these newly discovered compounds. Furthermore, they are useful for the preparation of the therapeutically valuable pharmaceutically-acceptable salts. Of this group, the more common salts include those formed with hydrofluoric and perchloric acids. Hydrofluoride salts are particularly useful for the preparation of the pharmaceutically-acceptable salts. The hydrochloride salts, for example, may be prepared by the solution of the hydrofluoride salts in hydrochloric acid and the crystallization of the hydrochloride salt thereby formed.

When the novel compounds of Formulae I and II are to be used as bronchodilating agents, they may be administered either alone or preferably in combination with a pharmaceutically-acceptable carrier. They may be combined with various pharmaceutically-acceptable inert carriers in the form of tablets, capsules, lozenges, troches, hard candies, powders, sprays, aqueous suspensions or solutions, injectable solutions, elixirs, syrups and the like. Such carriers include solid diluents, or filters, sterile aqueous media and various non-toxic organic solvents. Moreover, the oral pharmaceutical compositions of this invention may be suitably sweetened and flavored by means of various agents of the type commonly used for this purpose.

The particular carrier selected and the proportion of active ingredient to carrier are influenced by the solubility and chemical nature of the therapeutic compounds, the chosen route of administration and the needs of the standard pharmaceutical practice. For example, where these compounds are administered orally in tablet form, excipients such as lactose, sodium citrate, calcium carbonate and dicalcium phosphate may be used. Various disintegrants such as starch, alginic acids, and certain complex silicates, together with lubricating agents such as magnesium stearate, sodium lauryl sulphate and talc, may also be used in producing tablets for the oral administration of these compounds. For oral administration in capsule form, lactose and high molecular weight polyethylene glycols are among the preferred materials for use as pharmaceutically-acceptable carriers. Where aqueous suspensions are to be used for oral administration, the compounds of this invention may be combined with emulsifying or suspending agents. Diluents such as ethanol, propylene glycol, glycerine and their combinations may be employed as well as other materials.

For purposes of parenteral administration and inhalation, solutions or suspensions of the instant compounds in sesame or peanut oil or in aqueous propylene glycol solutions can be employed, as well as sterile aqueous solutions of the soluble acid addition salts described hereinbefore.

The instant compounds may be administered to subjects suffering from bronchoconstriction by means of inhalators or other devices which permit the active compounds to come into direct contact with the constricted areas of the tissues of the subject. When administered by means of a spray formulated as a 1% solution, utilization several times a day is preferred.

It is necessary that the active ingredient form a proportion of the composition such that a suitable dosage form will be obtained. Obviously, several dosage unit forms may be administered at about the same time. It is preferred to use compositions containing not less than 0.01% of the active ingredient; otherwise the amount of carrier becomes excessively large. Activity increases with the concentration of the active ingredient. The composition may contain 10, 50, 75, 95 or an even higher percentage by weight of the active.

The physician will determine the dosage which will be most suitable, and it will vary with the age, weight and response of the particular patient as well as with the nature and extent of the symptoms and the pharmacological characteristics of the particular agent to be administered. Generally, small doses will be administered initially, with a gradual increase in the dosage until the optimum level is determined. It will often be found that when the composition is administered orally, larger quantities of the active ingredient will be required to produce the same level as produced by a small quantity administered parenterally. In general, a dosage level within the range of from about 0.02 to about 200 mg. of active ingredient per kilogram of body weight, administered in single or multiple dose units, will effectively alleviate bronchoconstriction. Of course, there can be individual cases where higher or lower dosage levels are desirable, and such are within the scope of this invention.

The compounds of the instant invention which are preferred as bronchodilators are those of Formula I and also those wherein X and Y are each alkoxyl. Those compounds of Formula I wherein X and Y are each methoxy and $R_1$ and $R_2$ are each hydrogen or alkyl are particularly effective, and of these the following are especially preferred embodiments, either as the free base or pharmaceutically-acceptable salt: 2-amino-6,7-dimethoxy-4H-1,3-benzothiazine-4-one, 2-dimethylamino-6,7-dimethoxy-4H-1,3-benzothiazine-4-one, 2 - di - n - propylamino-6,7-dimethoxy-4H-1,3-benzothiazine-4-one and the ethyl ester of 4-(6,7-dimethoxy-4-oxo-4H-1,3-benzothiazin-2-yl) - piperazine-1-carboxylic acid.

The instant compounds also have been observed to inhibit the activity of the enzyme cyclic 3',5'-nucleotide phosphodiesterase, which catalyzes the conversion of adenosine - 3',5' - monophosphate (cyclic 3',5'-AMP) to adenosine-5'-monophosphate (5'-AMP). Thus, in systems containing phosphodiesterase in which it is desirable to maintain a high cyclic 3',5'-AMP level, the instant compounds might be used to great advantage. They are sufficiently potent inhibitors of the enzyme activity that concentrations as low as $10^{-4}$ molar and even lower are effective. The ability of the instant compounds to inhibit the enzyme activity is of significance since it is well known that many tissues exhibit cyclic 3',5'-nucleotide phosphodiesterase activity, and that the mononucleotide cyclic 3',5'-AMP is an important regulator of numerous cellular and tissue processes, e.g. smooth muscle relaxation, lipolysis and glycolysis. The instant compounds are tissue-specific inhibitors of the enzyme, i.e. they will inhibit the enzyme in certain tissues and not in others; therefore, when it is desirable to raise the cyclic 3',5'-AMP level in only one of several types of tissues which are present, use of the instant compounds is particularly advantageous.

The following examples are given to more fully illustrate the present invention. It is understood that these examples are for illustrative purposes only and are not to be considered as being the only manner in which the invention may be embodied or as limiting the scope thereof.

EXAMPLE I 2-amino-6,7-dimethoxy-4H-1,3-benzothiazine-4-one

A mixture of methyl 3,4-dimethoxy-6-mercaptobenzoate (5.0 g., 0.022 mole) and cyanamide (0.92 g., 0.022 mole) in 30 ml. of triethylamine was stirred at reflux temperature for one hour. There was a complete dissolution of material after 5 minutes, and the desired product precipitated after 10 minutes. The resulting mixture was chilled and then filtered to remove the product 5.3 g. (100%), which was then recrystallized from methanol to afford pure product, 2.7 g. (52%), M.P. 329–331° C. (dec.).

EXAMPLE II 2-dimethylamino-6,7-dimethoxy-4H-1,3-benzothiazine-4-one

The procedure of Example I was repeated, wherein an equivalent amount of dimethylcyanamide was used in place of said cyanamide, to afford the desired product which was recrystallized from methanol/chloroform, M.P. 267–268° C.

EXAMPLE III

The procedure of Example I was repeated, wherein an equivalent amount of appropriately substituted cyanamide was used, to afford the following compounds:

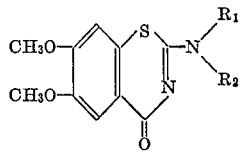

| $R_1$ | $R_2$ | Recrystallization solvent | M.P., ° C. |
|---|---|---|---|
| H | $CH_3$ | | 264–266 |
| H | $C_2H_5$ | Chloroform | 223.5–224 |
| H | $C_6H_5$ | Dimethylformamide | 243–246 |
| $C_2H_5$ | $C_2H_5$ | Ppt. from HCl salt | 142–143.5 |
| n-$C_3H_7$ | n-$C_3H_7$ | | 104–106 |
| $CH_2CH=CH_2$ | $CH_2CH=CH_2$ | Benzene/i-propyl ether | 109–110.5 |
| n-$C_4H_9$ | n-$C_4H_9$ | Diethyl ether | 101–104 |
| —$(CH_2)_5$— | | Ethyl acetate | 169.5–172.5 |
| —$(CH_2)_2$—O—$(CH_2)_2$— | | Methylene chloride/ether | 243.5–245 |
| —$(CH_2)_2$—N—$(CH_2)_2$—<br>         \|<br>    $CO_2C_2H_5$ | | Methanol/i-propyl ether | 215–216 |

EXAMPLE IV

The procedure of Example I is repeated, wherein an appropriately substituted methyl benzoate and appropriately substituted cyanamide are used in amounts equivalent to those of aforesaid procedure, to afford the following compounds.

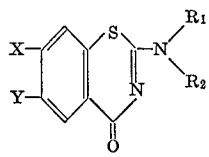

| X | Y | $R_1$ | $R_2$ |
|---|---|---|---|
| OH | OH | H | H |
| OH | OH | H | $C_2H_5$ |
| OH | $OC_2H_5$ | $CH_3$ | $CH_3$ |
| OH | $OCH_3$ | n-$C_6H_{13}$ | H |
| $OCH_3$ | $OCH_3$ | H | $(CH_2)_2CH=CH_2$ |
| O-n-$C_4H_9$ | O-n-$C_4H_9$ | $CH_2CH_2OH$ | H |
| O-i-$C_3H_7$ | $OCH_3$ | $CH_2CH_2OH$ | $CH_2CH_2OH$ |
| —$OCH_2CH_2O$— | | α-$C_{10}H_7$ | $CH_3$ |
| —$OCH_2O$— | | $C_6H_5$ | $C_6H_5$ |
| $OC_2H_5$ | OH | —$(CH_2)_2$—S—$(CH_2)_2$— | |
| OH | OH | —$(CH_2)_2$—N—$(CH_2)_2$—<br>           \|<br>       n—$C_4H_9$ | |
| —$OCH_2CH_2$—<br>$CH_2CH_2O$— | | H | 2'-Br-$C_6H_4$ |
| OH | OH | $CH_3$ | 2'4'-diCl-$C_6H_3$ |
| OH | $OCH_3$ | $CH_3$ | 3'-$OCH_3$-$C_6H_4$ |
| OH | $OCH_3$ | H | 4'-$NH_2$-$C_6H_4$ |
| $OCH_3$ | $OCH_3$ | $CH_3$ | 3',5'-di$C_2H_5$-$C_6H_3$ |
| $OCH_3$ | $OCH_3$ | —$(CH_2)_2$—N—$(CH_2)_2$—<br>           \|<br>       $CH_2CH=CH_2$ | |
| $OCH_3$ | $OCH_3$ | —$(CH_2)_2$—N—$(CH_2)_2$—<br>           \|<br>       $C_6H_5$ | |
| $OCH_3$ | $OCH_3$ | —$(CH_2)_2$—N—$(CH_2)_2$—<br>           \|<br>       $C_6H_4O$-Cl | |

EXAMPLE V 2-amino-6,7-dimethoxy-H,1,3-benzothiazine-4-one hydrochloride

The hydrochloric acid salt of 2-amino-6,7-dimethoxy-4H-1,3-benzothiazine-4-one was prepared by mixing an alcoholic solution of the free base, prepared as in Example I, with dilute hydrochloric acid and evaporating the resulting solution to dryness, M.P. 299–305° C. (dec.).

EXAMPLE VI

The following hydrochloric acid salts were prepared by the procedure of Example V, using the appropriate free base as prepared in Examples II–III:

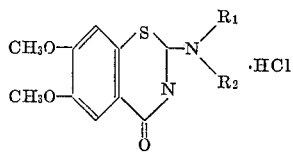

| $R_1$ | $R_2$ | M.P., ° C. |
|---|---|---|
| H | $CH_3$ | [1] 254–256 |
| H | $C_2H_5$ | 246–247 |
| $CH_3$ | $CH_3$ | 253–259 |
| $C_2H_5$ | $C_2H_5$ | 186.5–188 |
| n-$C_3H_7$ | n-$C_3H_7$ | 182–183 |
| $CH_2CH=CH_2$ | $CH_2CH=CH_2$ | 153–155 |
| —$(CH_2)_5$— | | [1] 195–198 |
| —$(CH_2)_2$—N—$(CH_2)_2$—<br>         \|<br>    $CO_2C_2H_5$ | | [1] 199–201 |

[1] Dec.

EXAMPLE VII

Additional acid addition salts of 2-amino-6,7-dimethoxy-4H-1,3-benzothiazine-4-one are prepared by the procedure of Example V wherein aqueous solutions of the following acids are used in place of said hydrochloric acid: hydrobromic acid, hydriodic acid, nitric acid, sulfuric acid, citric acid, phosphoric acid, maleic acid, tartaric acid and lactic acid.

EXAMPLE VIII 2-(β-aminoethyl)amino-6,7-dimethoxy-4H-1,3-benzothiazine-4-one

A mixture of methyl 3,4-dimethoxy-6-mercaptobenzoate (5.0 g., 0.022 mole) and β-aminoethylcyanamide (2.0 g., 0.022 mole) in 30 ml. of triethylamine is stirred at reflux temperature for one hour, after which time the desired product is isolated by filtration and purified by recrystallization from methanol/ether.

EXAMPLE IX

The procedure of Example VIII is repeated wherein appropriately substituted substrate materials are used in amounts equivalent to those of the procedure of Example VIII, to afford the following compounds:

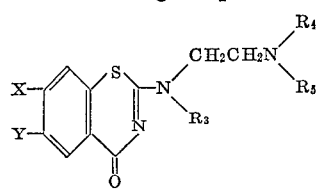

| X | Y | R₃ | R₄ | R₅ |
|---|---|---|---|---|
| OCH₃ | OCH₃ | H | CH₃ | CH₃ |
| OCH₃ | OCH₃ | CH₃ | CH₃ | CH₃ |
| OC₂H₅ | OC₂H₅ | CH₃ | CH₃ | C₂H₅ |
| O-n-C₄H₉ | O-n-C₄H₉ | H | n-C₄H₉ | n-C₄H₉ |
| O-i-C₃H₇ | OCH₃ | H | H | n-C₆H₁₃ |
| OC₂H₅ | OH | i-C₃H₇ | H | H |
| OH | OCH₃ | n-C₄H₉ | H | CH₃ |
| OH | OH | H | H | H |
| —OCH₂CH₂O— | | CH₃ | CH₃ | CH₃ |
| —OCH₂O— | | H | CH₃ | CH₃ |
| —OCH₂CH₂CH₂O— | | CH₃ | CH₃ | H |
| —OCH₂CH₂CH₂O— | | H | CH₃ | CH₃ |

EXAMPLE X

The hydrochloric acid addition salts of the products of Examples VIII–IX are prepared by mixing an alcoholic solution of each of said products with dilute hydrochloric acid and evaporating the resulting solution to dryness.

Additional acid addition salts of each of these products are similarly prepared by using aqueous solution of the following acids in place of said hydrochloric acid: hydrobromic acid, hydriodic acid, nitric acid, sulfuric acid, citric acid, phosphoric acid, maleic acid, tartaric acid and lactic acid.

EXAMPLE XI

Tablets

A tablet base is prepared by blending the following ingredients in the proportion by weight indicated:

| | |
|---|---|
| Sucrose, U.S.P. | 80.3 |
| Tapioca starch | 13.2 |
| Magnesium stearate | 6.5 |

Into this tablet base is blended sufficient 2-amino-6,7-dimethoxy-4H-1,3-benzothiazine-4-one to provide tablets containing 20, 100 and 250 mg. of active ingredient per tablet. The compositions are compressed into tablets, each weighing 360 mg., by conventional means.

EXAMPLE XII

Capsules

A blend is prepared containing the following ingredients in the proportion by weight indicated:

| | |
|---|---|
| Calcium carbonate, U.S.P. | 17.6 |
| Dicalcium phosphate | 18.8 |
| Magnesium trisilicate, U.S.P. | 5.2 |
| Lactose, U.S.P. | 5.2 |
| Potato starch | 5.2 |
| Magnesium stearate A | 0.8 |
| Magnesium stearate B | 0.35 |

To this blend is added sufficient 2-methylamino-6,7-dimethoxy-4H-1,3-benzothiazine-4-one to provide capsules containing 20, 100 and 250 mg. of active ingredient per capsule. The compositions are filled into conventional hard gelatin capsules in the amount of 350 mg. per capsule.

EXAMPLE XIII

Injectable preparation

One thousand grams of 2-amino-6,7-dimethoxy-4H-1,3-benzothiazine-4-one hydrochloride is intimately mixed and ground with 2500 g. of sodium ascorbate. The ground dry mixture is placed in vials and sterilized with ethylene oxide after which the vials are sterilly stoppered. For intravenous administration, sufficient water is added to the materials in the vials to form a solution containing 10 mg. of active ingredient per milliliter of injectable solution.

EXAMPLE XIV

Suspension

A suspension is prepared with the following composition:

| | | |
|---|---|---|
| 70% aqueous sorbitol | g | 741.29 |
| Glycerine, U.S.P. | g | 185.35 |
| Gum acacia (10% solution) | ml | 100.00 |
| Polyvinylpyrrolidone | g | 0.5 |
| Distilled water—sufficient to make 1 liter. | | | to which sufficient 2-di-n-propylamino-6,7-dimethoxy-4H-1,3-benzothiazine-4-one is added to provide a concentration of 25 mg. of active ingredient per milliliter of suspension. Various sweeteners and flavorants may be added to improve the palatability of the suspension.

EXAMPLE XV

Parenteral solution

A solution is prepared with the following composition:

| | | |
|---|---|---|
| Magnesium cholride hexahydrate | g | 12.36 |
| Monoethanolamine | ml | 8.85 |
| Propylene glycol | g | 376.0 |
| Distilled water | ml | 94.0 | to which is added sufficient 2-dimethylamino-6,7-dimethoxy-4H-1,3-benzothiazine-4-one hydrochloride to afford a concentration of 25 mg. of active ingredient per milliliter of solution. The resulting solution is suitable for parenteral and especially for intravenous administration.

EXAMPLE XVI

Bronchodilator activity

Conscious female guinea pigs, which had been fasted for 12 hours, received oral or parenteral dosages of the compound which was to be tested for effectiveness. Control animals received doses of saline solution which did not contain the compound which was under test. Subsequent to this administration, each animal was challenged with histamine aerosol.

The challenge procedure consisted of spraying a 0.4 percent aqueous solution of histamine, at a pressure of 5 lb./in.² into an 8 x 8 x 12 inch plastic container for one minute. Immediately after the container was subjected to the histamine spray the animal was placed within it. At the end of one minute of exposure, the respiratory status, which is a reflection of bronchoconstriction, was evaluated. Evaluation levels were designated and scored as normal breathing (0), slightly deepened breathing (1), labored breathing (2), severely labored breathing and ataxia (3) and unconsciousness (4). Each group of animals contained 8 to 10 individuals and a control group containing the same approximate number was used. The scores for the control group and the group which had been treated with the compound under test were compared and the difference was expressed as percent protection.

The doses, which were given orally, were 60 mg./kg. and the animals were challenged with histamine 60 minutes later. The standard compound used was theophylline which gave 25 percent protection when a dose of 60 mg./kg. was administered orally and the animal was challenged one hour later. When the compounds listed below were administered according to this procedure and the animals were challenged accordingly, the following percent protection was observed.

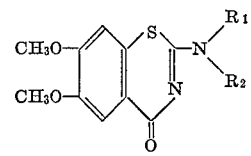

| $R_1$ | $R_2$ | Average percent protection |
|---|---|---|
| H | H | 64 |
| H | $CH_3$ | 23 |
| H | $C_2H_5$ | 21 |
| H | $C_6H_5$ | 10 |
| $CH_3$ | $CH_3$ | 38 |
| $C_2H_5$ | $C_2H_5$ | 14 |
| $n\text{-}C_3H_7$ | $n\text{-}C_3H_7$ | 43 |
| $CH_2CH=CH_2$ | $CH_2CH=CH_2$ | 19 |
| $n\text{-}C_4H_9$ | $n\text{-}C_4H_9$ | 11 |
| $-(CH_2)_5-$ | | 7 |
| $-(CH_2)_2-O-(CH_2)_2-$ | | 7 |
| $-(CH_2)_2-N-(CH_2)_2-$ <br> $\quad\quad\quad\quad\mid$ <br> $\quad\quad\quad CO_2C_2H_5$ | | 29 |

What is claimed is:
1. A compound of the formulae:

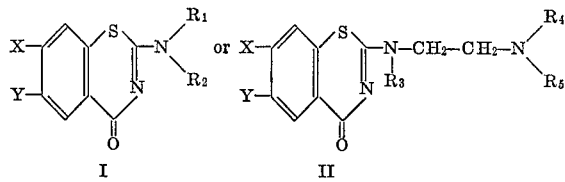

I    II wherein:
X and Y are each selected from the group consisting of hydroxyl, alkoxyl containing up to 4 carbon atoms, and, X and Y taken together, alkylenedioxy containing up to 4 carbon atoms;
$R_1$ and $R_2$ are each selected from the group consisting of hydrogen, alkyl containing up to 6 carbon atoms, alkenyl containing up to 6 carbon atoms, β-hydroxyethyl, phenyl having up to 2 substituents each selected from the group consisting of alkyl containing up to 3 carbon atoms, alkoxyl containing up to 2 carbon atoms, halogen and amino, and $R_1$ and $R_2$, when taken together, form a heterocycle selected from the group consisting of morpholino, thiomorpholino, piperazino, N-carbalkoxypiperazino wherein said carbalkoxy moiety contains up to 4 carbon atoms, N-alkylpiperazino wherein said alkyl moiety contains up to 4 carbon atoms, N-alkenylpiperazino wherein said alkenyl moiety contains up to 4 carbon atoms, and N-phenylpiperazino wherein said phenyl moiety has up to 2 substituents each selected from the group consisting of alkyl containing up to 3 carbon atoms, alkoxyl containing up to 2 carbon atoms, halogen and amino; and
$R_3$, $R_4$ and $R_5$ are each hydrogen or alkyl containing up to 6 carbon atoms; and the pharmaceutically acceptable salts thereof.
2. A compound of claim 1 wherein X and Y are each alkoxyl containing up to 4 carbon atoms.
3. The compound of claim 1 of Formula I wherein X and Y are each methoxy and $R_1$ and $R_2$ are each hydrogen.
4. The compound of claim 1 of Formula I wherein X and Y are such methoxy and $R_1$ and $R_2$ are each methyl.
5. The compound of claim 1 of Formula I wherein X and Y are each methoxy and $R_1$ and $R_2$ are each n-propyl.
6. The compound of claim 1 of Formula I wherein X and Y are each methoxy and $R_1$ and $R_2$, taken together, form N-carbethoxypiperazine.

References Cited

UNITED STATES PATENTS 2,776,281   1/1957   Wright _____ 260—243 XR

OTHER REFERENCES

Howard: J. Org. Chem., vol. 29, pp. 761–2 (1964).

HENRY R. JILES, Primary Examiner

J. M. FORD, Assistant Examiner

U.S. Cl. X.R.

424—246